United States Patent
Gururaja et al.

(10) Patent No.: US 11,861,134 B2
(45) Date of Patent: *Jan. 2, 2024

(54) SYSTEMS AND METHODS FOR ENHANCING IMAGE CONTENT CAPTURED BY A MACHINE VISION CAMERA

(71) Applicant: ZEBRA TECHNOLOGIES CORPORATION, Lincolnshire, IL (US)

(72) Inventors: Abhilash Gururaja, Levittown, NY (US); Christopher M. West, South Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,588

(22) Filed: Nov. 21, 2022

(65) Prior Publication Data

US 2023/0086311 A1    Mar. 23, 2023

Related U.S. Application Data

(63) Continuation of application No. 17/375,846, filed on Jul. 14, 2021, now Pat. No. 11,507,245.

(60) Provisional application No. 63/182,392, filed on Apr. 30, 2021.

(51) Int. Cl.
| | |
|---|---|
| G06F 3/0481 | (2022.01) |
| G06F 9/451 | (2018.01) |
| G06T 7/00 | (2017.01) |
| H04N 23/00 | (2023.01) |

(52) U.S. Cl.
CPC ........... *G06F 3/0481* (2013.01); *G06F 9/451* (2018.02); *G06T 7/0004* (2013.01); *H04N 23/00* (2023.01)

(58) Field of Classification Search
CPC .......................... G06F 3/0481; G06T 7/0004
See application file for complete search history.

(56) References Cited

U.S. PATENT DOCUMENTS

| | | | |
|---|---|---|---|
| 2007/0146491 A1* | 6/2007 | Tremblay | H04N 23/00 348/211.99 |
| 2008/0253608 A1* | 10/2008 | Long | G06K 7/14 348/222.1 |
| 2010/0027894 A1* | 2/2010 | Dahari | G06T 7/0008 382/218 |

(Continued)

*Primary Examiner* — Mong-Shune Chung
(74) *Attorney, Agent, or Firm* — Yuri Astvatsaturov

(57) ABSTRACT

Systems and methods for enhancing image content captured by a machine vision camera are disclosed herein. An example method includes receiving an image captured by a machine vision camera that includes a plurality of visual features, determining bounds of a bounding region for each respective visual feature, and displaying a plurality of entries corresponding to the respective visual feature. The example method further includes receiving a selection of an entry, and determining coordinate limits of the bounding region and a secondary region of the entry. The example method further includes displaying the image such that a center-point of the secondary box is positioned near a center-point of a display region, and scaling the image such that at least one of a vertical pixel count or a horizontal pixel count of the secondary region is within a ratio threshold of a vertical pixel count or a horizontal pixel count of the display region.

20 Claims, 11 Drawing Sheets

(56) References Cited

U.S. PATENT DOCUMENTS

| | | | |
|---|---|---|---|
| 2014/0357312 A1* | 12/2014 | Davis | H04N 23/70 |
| | | | 455/550.1 |
| 2017/0262724 A1* | 9/2017 | Wu | G06V 10/25 |
| 2019/0073785 A1* | 3/2019 | Hafner | G06T 3/60 |
| 2019/0164001 A1* | 5/2019 | Wan | G06F 9/4881 |
| 2021/0133496 A1* | 5/2021 | Barnehama | G06F 18/41 |
| 2021/0281739 A1* | 9/2021 | Takahashi | H04R 1/406 |

\* cited by examiner

SYSTEMS AND METHODS FOR ENHANCING IMAGE CONTENT CAPTURED BY A MACHINE VISION CAMERA

CROSS-REFERENCE TO RELATED APPLICATIONS

This application is a continuation of U.S. patent application Ser. No. 17/375,846, filed on Jul. 14, 2021, which claims priority from provisional U.S. Patent Application Ser. No. 63/182,392, filed on Apr. 30, 2021, both of which are incorporated herein by reference in their entirety.

BACKGROUND

Over the years, industrial automation has come to rely heavily on machine vision components capable of assisting operators in a wide variety of tasks. In some implementations, machine vision components, like cameras, are utilized to track objects passing objects, like those which move on conveyor belts past stationary cameras. Often these cameras, along with the backend software, are used to capture images and determine a variety of parameters associated with the passing items. One aspect of this requires easy to use means to visualize various elements on the screen of a user computing device executing the backend software. Thus, there exists a need for improved systems and methods which, provide such features.

SUMMARY

In an embodiment, the present invention is a method for enhancing image content captured by a machine vision camera. The method may comprise: receiving, at an application executing on a user computing device communicatively coupled to a machine vision camera, an image captured by the machine vision camera, the image including a plurality of indicia, each of the plurality of indicia encoding a payload; identifying, in the image, each of the indicia; for each respective indicia in the image, determining bounds of a respective bounding box that substantially encompass each respective indicia in the image; displaying, on an interface of the application, a plurality of entries, each of the plurality of entries corresponding to a respective indicia of the plurality of indicia; receiving, at the interface, a selection of one of the entries resulting in a selected entry that has a corresponding indicia; determining, from the respective bounding box of the corresponding indicia, an upper pixel coordinate limit, a lower pixel coordinate limit, a first side pixel coordinate limit, and a second side coordinate limit; based on the upper pixel coordinate limit, the lower pixel coordinate limit, the first side pixel coordinate limit, and the second side coordinate limit, determining a secondary box having an upper bound, a lower bound, a first side bound, and a second side bound; displaying the image in a display region of the interface such that a center-point of the secondary box is positioned within a predetermined distance threshold from a center-point of the display region; and scaling the image such that at least one of (i) a first vertical pixel count between the upper bound and the lower bound is within a first predetermined ratio threshold of a second vertical pixel count of the display region, or (ii) a first horizontal pixel count between the first side bound and the second side bound is within a second predetermined ratio threshold of a second horizontal pixel count of the display region.

In a variation of this embodiment, the method may further comprise for each respective indicia in the image, displaying the respective bounding box on an interface of the application.

In another variation of this embodiment, at least one of the first predetermined ratio threshold or the second predetermined ratio threshold is inclusively between 1:2 and 2:3.

In yet another variation of this embodiment, scaling the image includes scaling the image such that (i) the first vertical pixel count does not exceed the first predetermined ratio threshold of the second vertical pixel count, and (ii) the first horizontal pixel count does not exceed the second predetermined ratio threshold of the second horizontal pixel count.

In still another variation of this embodiment, each of the plurality of entries includes a payload of the corresponding indicia.

In yet another variation of this embodiment, the method further comprises displaying the respective bounding box corresponding to each of the plurality of indicia appearing within a visible portion of the image displayed in the display region.

In still another variation of this embodiment, the method further comprises masking a masked region in the display region responsive to receiving the selection, wherein the masked region is a region outside of at least one of (i) the secondary box or (ii) the respective bounding box of the corresponding indicia.

In yet another variation of this embodiment, at least one of the first predetermined ratio threshold and the second predetermined ratio threshold is user-definable such that a portion of the corresponding indicia is excluded from the scaled image.

In still another variation of this embodiment, the method further comprises displaying a miniature version of the image in the display region as an overlay covering a portion of the scaled image, wherein the miniature version of the image includes an indicated portion representing the scaled image.

In another embodiment, the present invention is a method for enhancing image content captured by a machine vision camera. The method may comprise: receiving, at an application executing on a user computing device communicatively coupled to a machine vision camera, an image captured by the machine vision camera, the image including a plurality of indicia, each of the plurality of indicia encoding a payload; identifying, in the image, each of the indicia; for each of the indicia in the image: determining bounds of a respective bounding box that substantially encompass the respective indicia, determining, from the respective bounding box, an upper pixel coordinate limit, a lower pixel coordinate limit, a first side pixel coordinate limit, and a second side coordinate limit for the respective indicia, and based on the upper pixel coordinate limit, the lower pixel coordinate limit, the first side pixel coordinate limit, and the second side coordinate limit of the respective bounding box, determining a respective secondary box having an upper bound, a lower bound, a first side bound, and a second side bound for the respective indicia; displaying, on an interface of the application, a plurality of entries, each of the plurality of entries corresponding to a respective indicia of the plurality of indicia; receiving, at the interface, a selection of one of the entries resulting in a selected entry that has a corresponding indicia; displaying the image in a display region of the interface such that a center-point of the respective secondary box of the corresponding indicia is positioned within a predetermined distance threshold from a center-point of the display region; and scaling the image such that at least one of (i) a first vertical pixel count between the upper bound of the respective secondary box of the corresponding indicia and the lower bound of the respective secondary box of the corresponding indicia is within a first predetermined ratio threshold of a second vertical pixel count of the display region, or (2) a first horizontal pixel count between the first side bound of the respective secondary box of the corresponding indicia and the second side bound of the respective secondary box of the corresponding indicia is within a second predetermined ratio threshold of a second horizontal pixel count of the display region.

In a variation of this embodiment, the method further comprises for each of the indicia in the image, displaying the respective bounding box on an interface of the application.

In another variation of this embodiment, at least one of the first predetermined ratio threshold or the second predetermined ratio threshold is inclusively between 1:2 and 2:3.

In yet another variation of this embodiment, scaling the image further includes scaling the image such that (i) the first vertical pixel count does not exceed the first predetermined ratio threshold of the second vertical pixel count, and (2) the first horizontal pixel count does not exceed the second predetermined ratio threshold of the second horizontal pixel count.

In still another variation of this embodiment, each of the plurality of entries includes a payload of the corresponding indicia.

In yet another variation of this embodiment, the method further comprises displaying the respective bounding box corresponding to each of the plurality of indicia appearing within a visible portion of the image displayed in the display region.

In still another variation of this embodiment, the method further comprises masking a masked region in the display region responsive to receiving the selection, wherein the masked region is a region outside of one of (i) the respective secondary box of the corresponding indicia or (ii) the respective bounding box of the corresponding indicia.

In yet another embodiment, the present invention is a machine vision system for enhancing image content captured by a machine vision camera. The machine vision system may comprise: a machine vision camera configured to capture an image including a plurality of indicia, each of the plurality of indicia encoding a payload; and a user computing device executing an application, wherein the user computing device is communicatively coupled to the machine vision camera and is configured to: receive the image captured by the machine vision camera, identify, in the image, each of the indicia, for each respective indicia in the image, determine bounds of a respective bounding box that substantially encompass each respective indicia in the image, display, on an interface of the application, a plurality of entries, each of the plurality of entries corresponding to a respective indicia of the plurality of indicia, receive, at the interface, a selection of one of the entries resulting in a selected entry that has a corresponding indicia, determine, from the respective bounding box of the corresponding indicia, an upper pixel coordinate limit, a lower pixel coordinate limit, a first side pixel coordinate limit, and a second side coordinate limit, based on the upper pixel coordinate limit, the lower pixel coordinate limit, the first side pixel coordinate limit, and the second side coordinate limit, determine a secondary box having an upper bound, a lower bound, a first side bound, and an second side bound, display the image in a display region of the interface such that a center-point of the secondary box is positioned within a predetermined distance threshold from a center-point of the display region, and scale the image such that at least one of (i) a first vertical pixel count between the upper bound and the lower bound is within a first predetermined ratio threshold of a second vertical pixel count of the display region, or (ii) a first horizontal pixel count between the first side bound and the second side bound is within a second predetermined ratio threshold of a second horizontal pixel count of the display region.

In a variation of this embodiment, the user computing device is further configured to for each of the indicia in the image, display the respective bounding box on an interface of the application.

In another variation of this embodiment, at least one of the first predetermined ratio threshold or the second predetermined ratio threshold is inclusively between 1:2 and 2:3.

In yet another variation of this embodiment, the user computing device is further configured to scale the image such that (i) the first vertical pixel count does not exceed the first predetermined ratio threshold of the second vertical pixel count, and (2) the first horizontal pixel count does not exceed the second predetermined ratio threshold of the second horizontal pixel count.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 4A and 4B each depict an example application interface illustrating a stage of image enhancement corresponding to generating a secondary box that substantially encompasses indicia included in an image captured by a machine vision camera, in accordance with embodiments of the present disclosure.

FIGS. 5A-5C each depict an example application interface illustrating a stage of image enhancement corresponding to scaling and/or otherwise emphasizing a chosen indicia within an image captured by a machine vision camera, in accordance with embodiments of the present disclosure.

Figure 1:
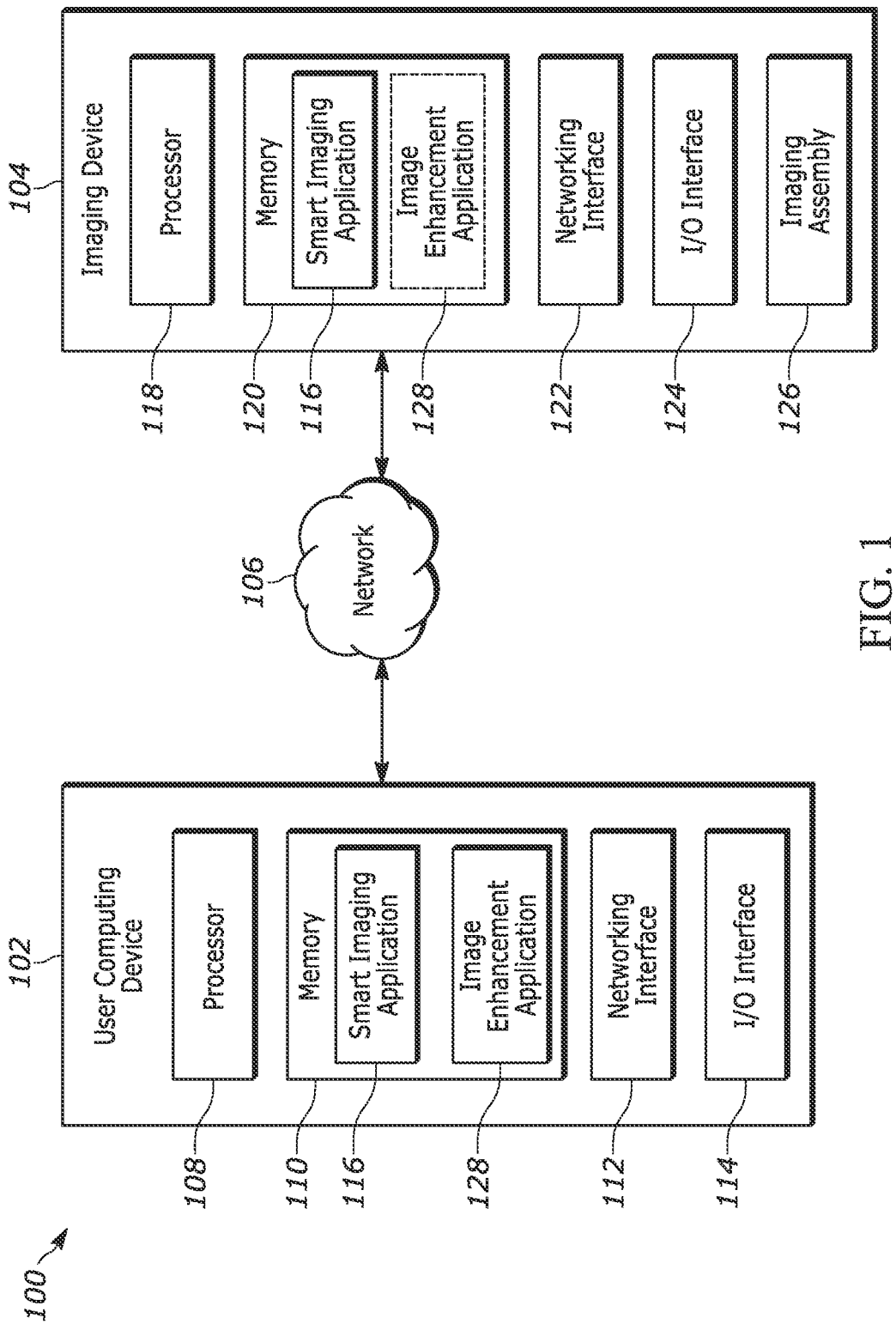
FIG. 1 is an example system configured to enhance image content captured by a machine vision camera, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Machine vision system owners/operators periodically have a need to visually evaluate images captured by the system's imaging equipment. In doing so, there arises a need to zoom in on certain elements (like barcodes) within the captured images for closer evaluation. This can be difficult to accomplish in an automatic manner, especially if multiple elements of the same kind are present on the screen. Approaches described herein address these difficulties and provide a solution which helps automate and simplify the zooming process.

FIG. 1 illustrates an example imaging system 100 configured to enhance image content captured by a machine vision camera, in accordance with various embodiments disclosed herein. In the example embodiment of FIG. 1, the imaging system 100 includes a user computing device 102 and an imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description. The user computing device 102 is generally configured to enable a user/operator to create a machine vision job for execution on the imaging device 104. When created, the user/operator may then transmit/upload the machine vision job to the imaging device 104 via the network 106, where the machine vision job is then interpreted and executed. The user computing device 102 may comprise one or more operator workstations, and may include one or more processors 108, one or more memories 110, a networking interface 112, an input/output (I/O) interface 114, a smart imaging application 116, and an image enhancement application 128. It is to be understood, that a "machine vision job" as referenced herein may be or include any suitable imaging job including any suitable executable tasks, such as machine vision tasks, barcode decoding tasks, and/or any other tasks or combinations thereof.

The imaging device 104 is connected to the user computing device 102 via a network 106, and is configured to interpret and execute machine vision jobs received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the user computing device 102. Additionally, or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120, a networking interface 122, an I/O interface 124, and an imaging assembly 126. The imaging assembly 126 may include a digital camera and/or digital video camera for capturing or taking digital images and/or frames. Each digital image may comprise pixel data that may be analyzed by one or more tools each configured to perform an image analysis task. The digital camera and/or digital video camera of, e.g., the imaging assembly 126 may be configured, as disclosed herein, to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In embodiments, imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The composite area defined by the ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the smart imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the smart imaging application 116 and/or the image enhancement application 128, which may be configured to enable machine vision job construction/execution, as described further herein. Additionally, or alternatively, the smart imaging application 116 and/or the image enhancement application 128 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116 and/or the image enhancement application 128, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally, or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some embodiments, an administrator or user/operator may access the user computing device 102 and/or imaging device 104 to construct jobs, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2A:
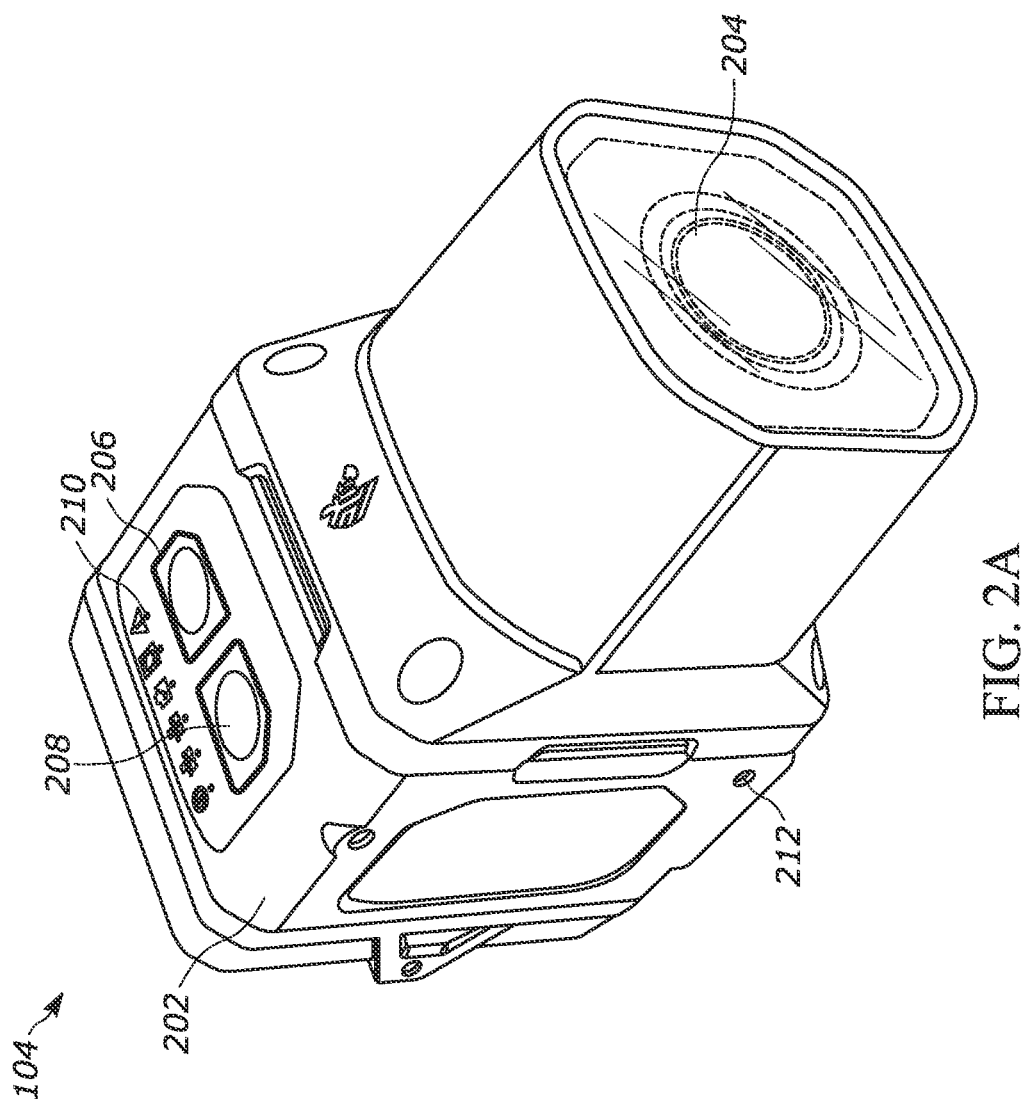
FIG. 2A is a perspective view of the imaging device of FIG. 1, in accordance with embodiments described herein.

FIG. 2A is a perspective view of the imaging device 104 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., smart imaging application 116, image enhancement application 128). The trigger configuration screen may allow the user to configure one or more triggers for the imaging device 104 that may be stored in memory (e.g., one or more memories 110, 120) for use in later developed machine vision jobs, as discussed herein.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., smart imaging application 116, image enhancement application 128). The imaging configuration screen may allow the user to configure one or more configurations of the imaging device 104 (e.g., aperture size, exposure length, etc.) that may be stored in memory (e.g., one or more memories 110, 120) for use in later developed machine vision jobs, as discussed herein.

To further this example, and as discussed further herein, a user may utilize the imaging configuration screen (or more generally, the smart imaging application 116 and/or the image enhancement application 128) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 2B:
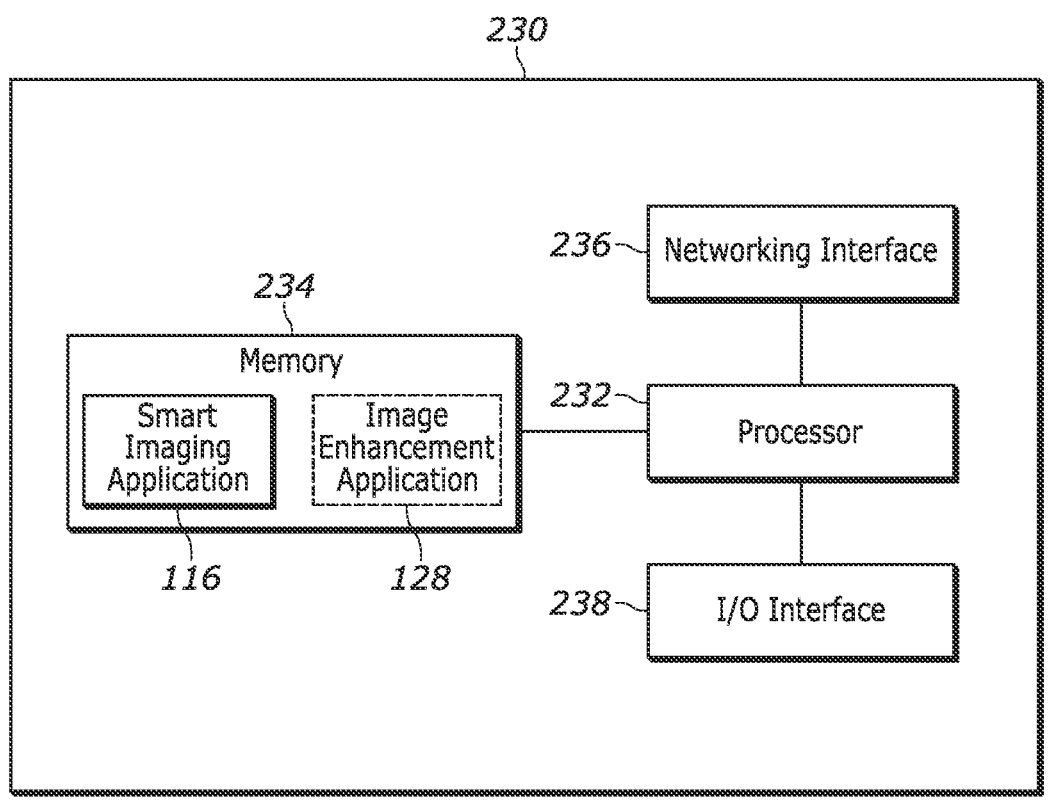
FIG. 2B is a block diagram of an example logic circuit for implementing example methods and/or operations described herein.

FIG. 2B is a block diagram representative of an example logic circuit capable of implementing, for example, one or more components of the example imaging device 104 of FIG. 2A. The example logic circuit of FIG. 2B is a processing platform 230 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 230 of FIG. 2B includes a processor 232 such as, for example, one or more microprocessors, controllers, and/or any suitable type of processor. The example processing platform 230 of FIG. 2B includes memory (e.g., volatile memory, non-volatile memory) 234 accessible by the processor 232 (e.g., via a memory controller). The example processor 232 interacts with the memory 234 to obtain, for example, machine-readable instructions stored in the memory 234 corresponding to, for example, the operations represented by the flowcharts of this disclosure. The memory 234 also includes the smart imaging application 116 and, optionally, the image enhancement application 128 that are each accessible by the example processor 232. The smart imaging application 116 and/or the image enhancement application 128 may comprise rule-based instructions, an artificial intelligence (AI) and/or machine learning-based model, and/or any other suitable algorithm architecture or combination thereof configured to, for example, enhance image content captured by a machine vision camera (e.g., imaging device 104). To illustrate, the example processor 232 may access the memory 234 to execute the smart imaging application 116 and/or the image enhancement application 128 when the imaging device 104 (via the imaging assembly 126) captures an image that includes a plurality of indicia that each encode a payload. Additionally, or alternatively, machine-readable instructions corresponding to the example operations described herein may be stored on one or more removable media (e.g., a compact disc, a digital versatile disc, removable flash memory, etc.) that may be coupled to the processing platform 230 to provide access to the machine-readable instructions stored thereon.

The example processing platform 230 of FIG. 2B also includes a networking interface 236 to enable communication with other machines via, for example, one or more networks. The example networking interface 236 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example processing platform 230 of FIG. 2B also includes input/output (I/O) interfaces 238 to enable receipt of user input and communication of output data to the user. Such user input and communication may include, for example, any number of keyboards, mice, USB drives, optical drives, screens, touchscreens, etc.

Figure 3A:
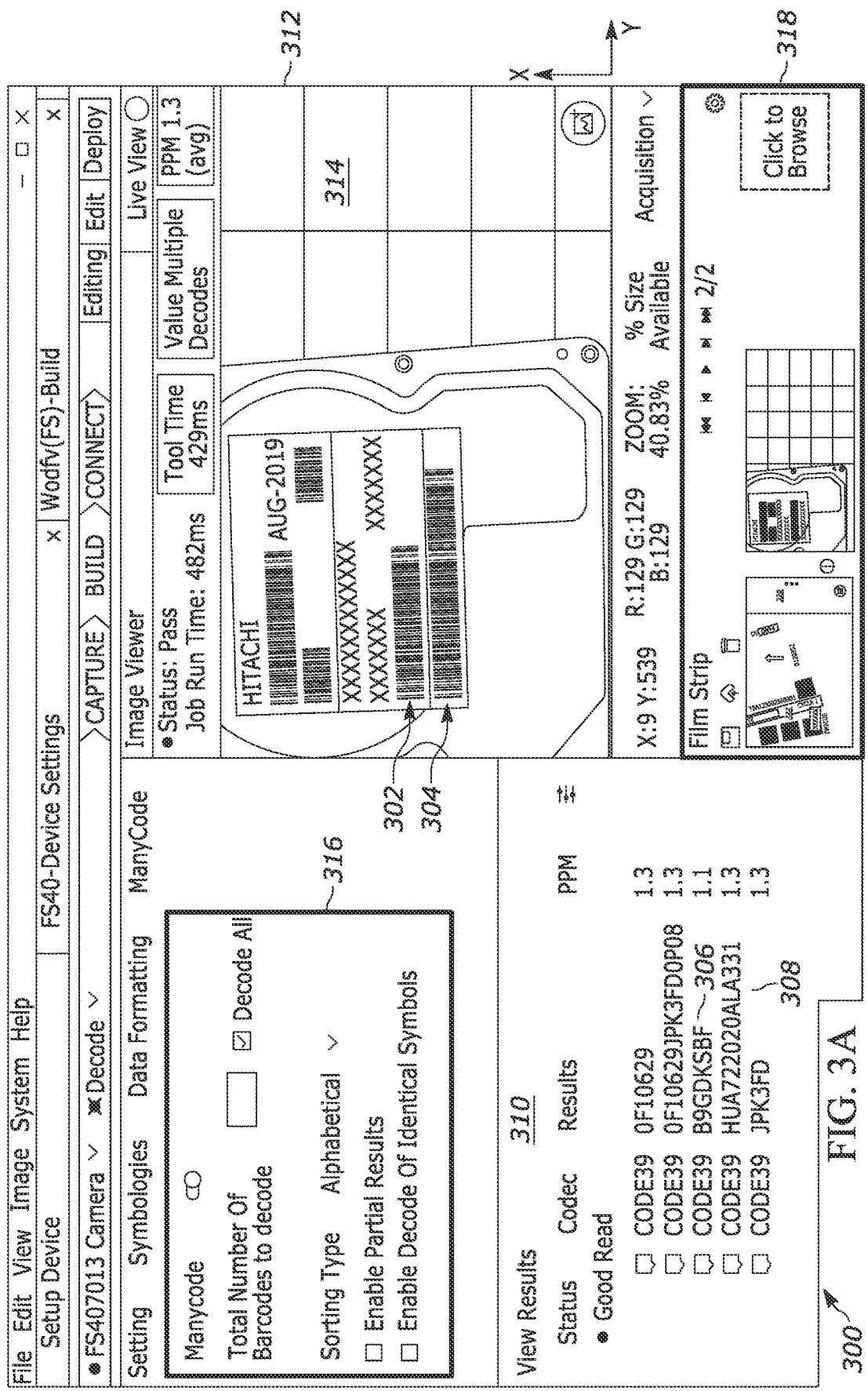
FIGS. 3A and 3B each depict an example application interface illustrating a stage of image enhancement corresponding to decoding indicia and displaying decoded payloads present in an image captured by a machine vision camera, in accordance with embodiments of the present disclosure.

FIG. 3A depicts an example application interface 300 which includes an example image 314 captured by an imaging device 104. The example application interface 300 may be displayed as part of a smart imaging application (e.g., smart imaging application 106), an image enhancement application (e.g., image enhancement application 128), and/or any other suitable application or combinations thereof. For example, the example application interface 300 may be rendered on an interface of a user computing device (e.g., user computing device 102) as a result of the imaging device executing a machine vision job, and may be formatted in accordance with instructions included as part of the smart imaging application 106. The particular image renderings and/or other aspects of the example application interface 300 may be determined and displayed in accordance with instructions included as part of the image enhancement application 128, as described herein.

In some instances, each image displayed in the example application interface 300 will include a barcode, such as barcode 302 and barcode 304. Depending on how a machine vision job is configured, the application (e.g., image enhancement application 128) may receive, from the imaging device, decoded barcode data associated with either barcode 302/304 (this may also be referred to as "barcode result data"). This information can be displayed in an appropriate location within the interface. In the depicted interface 300, the data decoded from barcode 302 is displayed as a string 306 and data decoded from barcode 304 is displayed as a string 308 within the entry window (noted as "View Results" in FIGS. 3A and 3B) 310.

As illustrated in FIG. 3A, the example application interface 300 additionally includes a settings portion 316 and a filmstrip portion 318. The settings portion 316 may generally allow a user to configure particular actions performed as part of the machine vision job, barcode decoding job, and/or any other suitable executable job that is executed by the imaging device. For example, the user may enable the "Decode All" option illustrated in FIG. 3A to configure the indicia decoder included as part of the machine vision job to decode any decodable indicia that is identifiable within the example image 314. As a result, the indicia decoder may decode each of the payloads from barcodes 302, 304, and display the results of the decoding within the entry window 310. The filmstrip portion 318 may include all captured images by the imaging device during an individual execution of the machine vision job. For example, as a target object passes by the imaging device, the imaging device may capture one or more images of the target object, and each of those captured images may be displayed within the filmstrip portion 318.

Figure 3B:
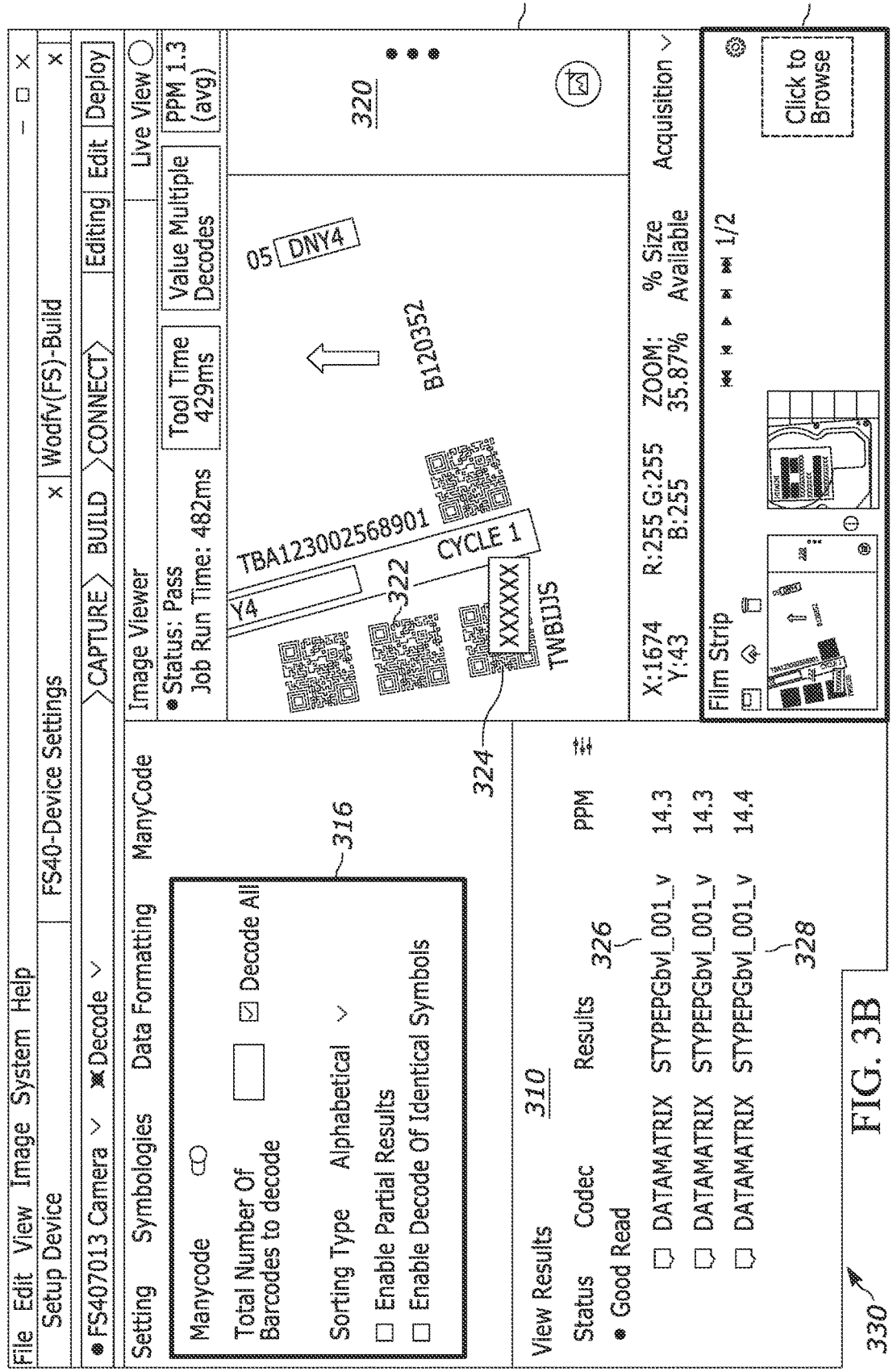

FIG. 3B depicts another example application interface 330 which includes another example image 320 captured by an imaging device 104. This example image 320 includes multiple indicia (e.g., quick response (QR) codes), and several of these indicia 322, 324 may be decoded by the indicia decoder included as part of the machine vision job executed by the imaging device. The data decoded from indicia 322 is displayed as a string 326, and the data decoded from indicia 324 is displayed as a string 328 within the entry window 310. Thus, the indicia decoding performed as part of machine vision jobs described in the present disclosure may be configured to decode a payload from any suitable indicia, such as barcodes, QR codes, data matrices, etc.

According to some aspects of the present disclosure, the application (e.g., image enhancement application 128) provides a means for a user to select a desired indicia and have the application automatically center the image about that indicia and zoom in on that indicia to a predetermined zoom level. Achieving this functionality can be particularly difficult due to the fact that indicia may come in a wide variety of shapes and sizes (e.g., barcodes 302, 304 and indicia 322, 324), and that depending on the operating environment, the dimensions of the indicia as they appear in the captured image may vary greatly.

In some implementations, the application may achieve this via the following. To identify which indicia the user wishes to zoom in on, the user may select the particular indicia by selecting a particular entry from the entry window 310. This can be done by hovering the pointer of a mouse over a line having the payload associated with the indicia of interest and then making a selection by clicking a mouse. Similar functionality may, for example, be achieved via a keyboard or any other input device that could allow for a selection of a specific entry associated with a desired indicia in the entry window 310. In other instances, the user may make a selection by hovering the mouse (or any other input device) over the desired indicia in the display region 312 and then executing the selection by clicking a mouse button. It should be appreciated that throughout this disclosure, references to input devices like a mouse should not be seen as limiting and other input devices should be considered to be within the scope of this disclosure. For example, it should be appreciated that in the event of the application being executed on a mobile device like a tablet or a notebook having touch-screen capabilities, a user's finger and the respective input functions via a screen may function just like the input functions of a computer mouse.

Prior or subsequent to the selection of a desired indicia, the application determines the bounds of a bounding box that substantially encompasses at least some of the indicia in the image. In some implementations where the determination is made prior to the selection of the desired indicia, the application may be configured to display at least one bounding box around each corresponding indicia visible in the image shown in the display region 312.

Generally, each bounding box may be comprised of a series of pixel points which correspond to the outer edges of each respective indicia. Consequently, each point of the bounding box will have an x,y pixel coordinate that is within the coordinate system of the image. From this, and as discussed herein, for each desired bounding box, the application (e.g., image enhancement application 128) can determine the highest pixel coordinate value in the vertical direction (x-axis) (also referred to as the upper pixel coordinate limit), the lowest pixel coordinate value in the vertical direction (x-axis) (also referred to as the lower pixel coordinate limit), the farthest side (e.g., left side) pixel coordinate value in the horizontal direction (y-axis) (also referred to as the first side pixel coordinate limit), and the farthest other side (e.g., right side) pixel coordinate value in the horizontal direction (y-axis) (also referred to as the second side pixel coordinate limit). Having this data allows the application to derive a secondary box for any desired indicia, where the secondary box is derived not from the shape or the orientation of the indicia, but from its coordinate limits. This provides the benefit of being able to orient the secondary box in a manner that is consistent with the display region, which in most implementations would result in the secondary box being approximately square or rectangular in shape with the top and bottom sides extending along a respective single height coordinate, and the two vertical sides extending along a respective single width coordinate.

Figure 4A:
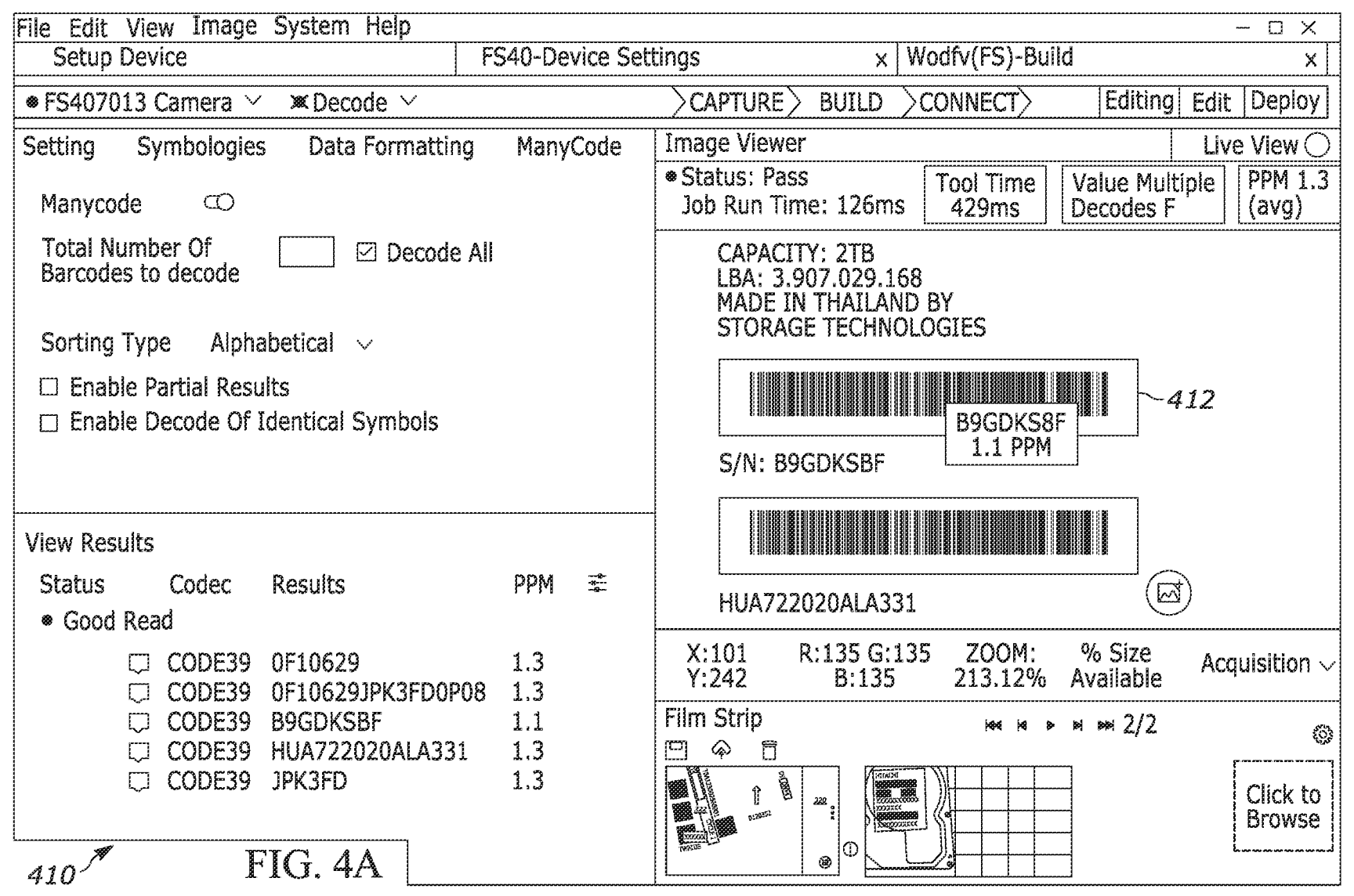
Figure 4B:
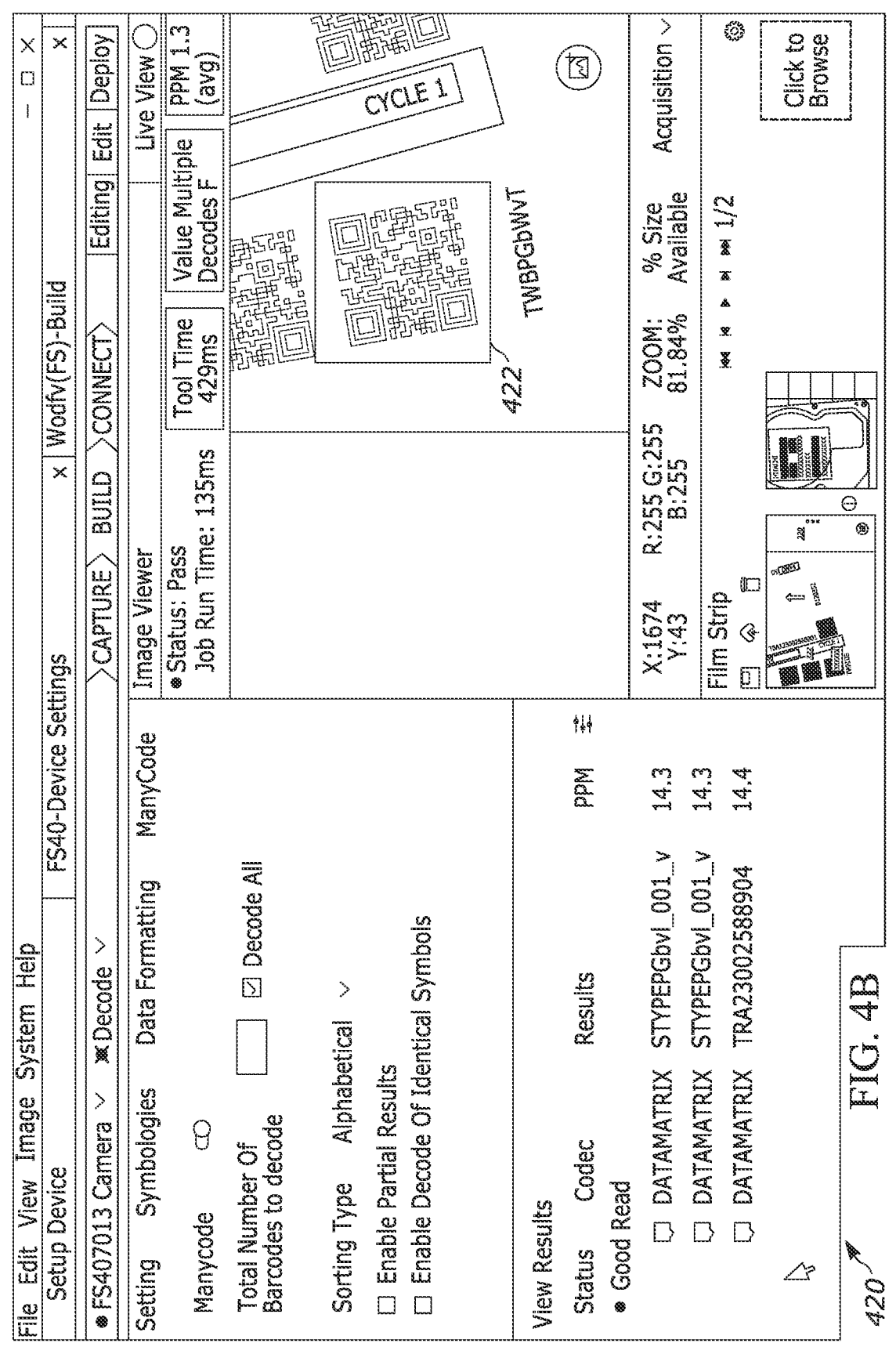

An example of such a secondary box is illustrated in both of FIGS. 4A and 4B as 412 and 422, respectively. FIG. 4A depicts an example application interface 410 that includes the secondary box 412. As illustrated in FIG. 4A, the displayed image may include multiple indicia, and more than one (e.g., the barcode contained within the secondary box 412 and the barcode below the secondary box 412) may be decodable. In this case, the image enhancement application may automatically recognize and decode each indicia included within the image, and may display the payloads resulting from the decoding. In certain aspects, the image enhancement application may determine the secondary box 412 in response to a user selection of the indicia included within the secondary box 412. Additionally, or alternatively, the image enhancement application may automatically determine the secondary box 412 and a secondary box substantially encompassing the other indicia in response to decoding each indicia. Of course, in either case, the image enhancement application may determine the secondary box (es) based on the coordinate limits corresponding to the decoded indicia.

Alternatively, in certain aspects, the displayed image may include multiple indicia, but only one (e.g., the barcode contained within the secondary box 412) may be decodable. In this case, the image enhancement application may automatically recognize and decode the indicia illustrated within the secondary box 412. Thereafter, the image enhancement application may determine the secondary box 412 based on the coordinate limits corresponding to the decoded indicia.

As yet another example, FIG. 4B depicts an example application interface 420 that includes the secondary box 422. As illustrated in FIG. 4B, the displayed image may include portions of multiple indicia, but only one (e.g., the QR code contained within the secondary box 422) may be fully decodable. In this case, the image enhancement application may automatically recognize and decode the indicia illustrated within the secondary box 422. Thereafter, the image enhancement application may determine the secondary box 422 based on the coordinate limits corresponding to the decoded indicia.

In any event, once the secondary box has been determined, the application (e.g., image enhancement application 128) may further be configured to reposition the image in the display region such that the center point of the secondary box associated with the indicia of interest (e.g., the indicia that was previously selected for viewing/analysis) is positioned within some threshold distance from the center point of the display region. In some aspects, the threshold distance may be zero and the center point of the secondary box can overlay the center point of the display region. In other implementations, a non-zero distance threshold (that could be expressed, for example, in terms of pixels) may be implemented. Ultimately, the outcome of such positioning is that the secondary box (and thus the indicia associated with it) will be centered at or visually near the center of the display region.

Figure 5A:
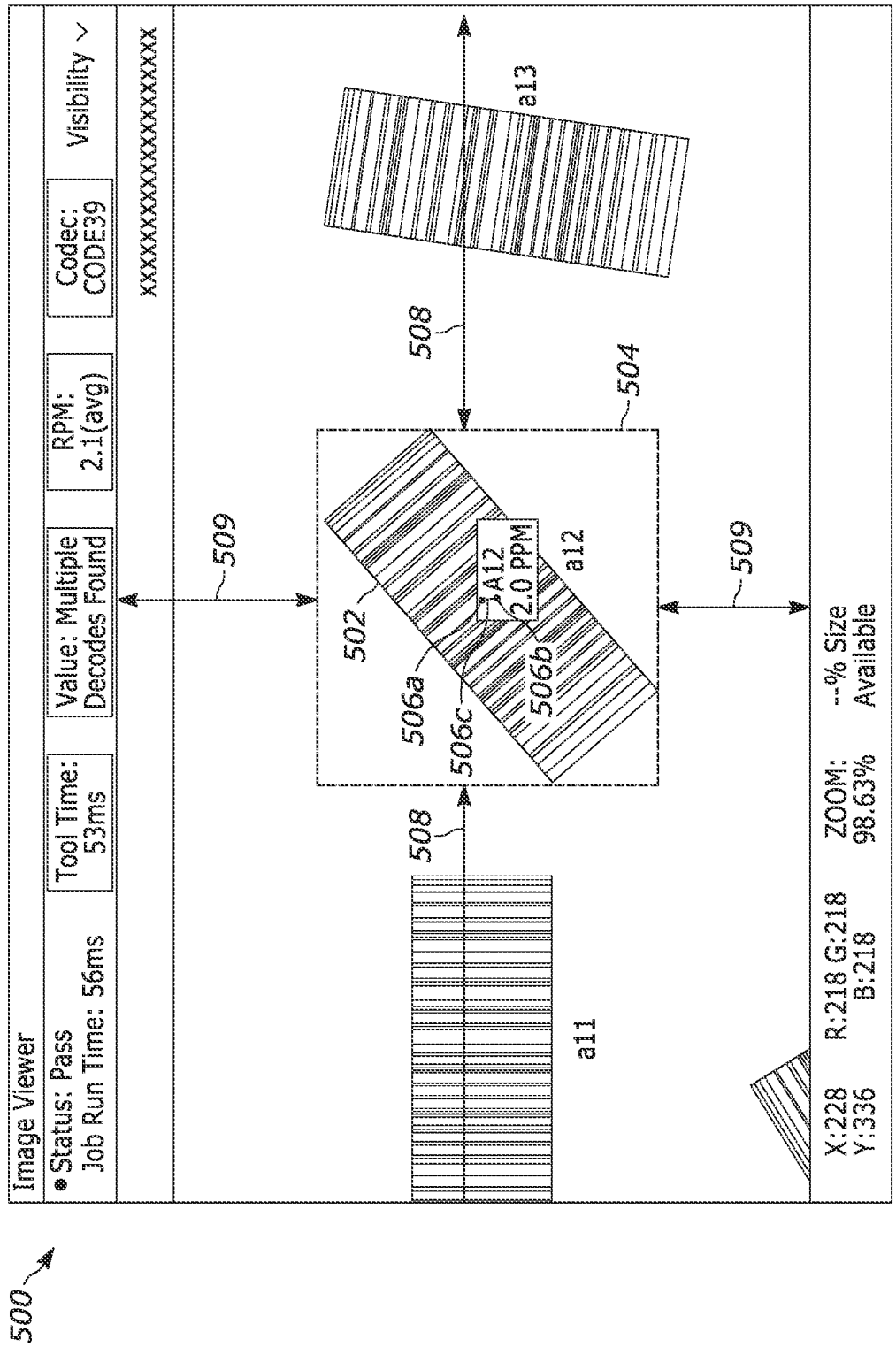

For example, and as illustrated in FIG. 5A, the image enhancement application may display the example application interface 500 in response to receiving a selection of an indicia from a user, and repositioning the image within the display region such that the indicia is substantially centered within the display region. The image enhancement application may receive an indication that a user has selected the indicia 502 within the image, and may proceed to determine the secondary box 504 based on the various coordinate limits (e.g., upper pixel coordinate limit, lower pixel coordinate limit, first side pixel coordinate limit, second side pixel coordinate limit) corresponding to the indicia 502.

Generally, as previously mentioned, the image enhancement application may reposition the image containing the indicia 502 such that the distance 506c between the two center-points 506a, 506b is at least less than a threshold distance. When the image enhancement application repositions the image, the application may also compare the center-point 506a of the secondary box to the center-point 506b of the display region to determine whether or not to reposition the image in order to more optimally decrease the distance 506c between the two center-points 506a, 506b. In this manner, the image enhancement application may position the indicia 502 chosen by the user as close to the center-point of the display region as possible (e.g., the distance 506c between the two center-points 506a, 506b is eliminated).

Further, when the image enhancement application repositions the image, the application may also scale the viewpoint (up or down) such that the secondary box 504 occupies some predetermined amount of the display window. For instance, the scaling performed by the image enhancement application may be expressed as a ratio of the pixels occupied by the secondary box 504 in a vertical direction to the vertical pixel count of the display region. Thus, if the desired ratio is 1:2, and the secondary box 504 has a height of 200 pixels while the display region has a height of 1000 pixels, the viewpoint will be scaled 2.5 times such that the secondary box 504 occupies 500 pixels. The image enhancement application may apply the same or a similar approach along the horizontal axis.

Of course, it should be appreciated that unless the aspect ratio of the secondary box (e.g., secondary box 504) matches the aspect ratio of the display region, the horizontal secondary box to display region ratio may not be equal to the vertical secondary box to display region ratio. Thus, when the image enhancement application scales the image in certain aspects, the application will scale the viewpoint such that the ratio of both the horizontal secondary box to display region and the vertical secondary box to display region is at or below the desired threshold. This can help prevent instances where a relatively narrow but tall viewpoint is scaled based on a horizontal ratio without regard for a vertical ratio.

For instance, with a display region of 1000×2000 pixels and a secondary box of 400×100 pixels, scaling the image to where the horizontal secondary box to display region ratio is 1:2 requires scaling the image by 10. However, such an increase would cause the secondary box (and thus the indicia that is displayed therein) to increase to a height of 4000 pixels; which is beyond the display capabilities of the display region. Thus, in this instance the image enhancement application may limit scaling the image to 1.25, causing the secondary box to increase to dimensions of 500×125 pixels, meeting the 1:2 threshold requirement along the vertical axis. Alternatively, in certain aspects, a user may configure the image enhancement application to scale the image such that a portion of the selected indicia is not featured within the display region after the image is scaled.

For example, as illustrated in FIG. 5A, the image enhancement application may determine horizontal distances 508 between the vertical sides of the secondary box 504 and the vertical edges of the display region and vertical distances 509 between the horizontal sides of the secondary box 504 and the horizontal edges of the display region. Assume that the desired aspect ratio for the indicia 502 relative to the display region is 1:2. In this example, the image enhancement application may scale the image such that the total length of the horizontal distances 509 is equal to the length of one vertical side of the secondary box 504 and the total length of the vertical distances 508 is equal to the length of one horizontal side of the secondary box 504. Of course, it is to be understood that the image enhancement application may scale the image to any suitable aspect ratio, as previously described.

Figure 5B:
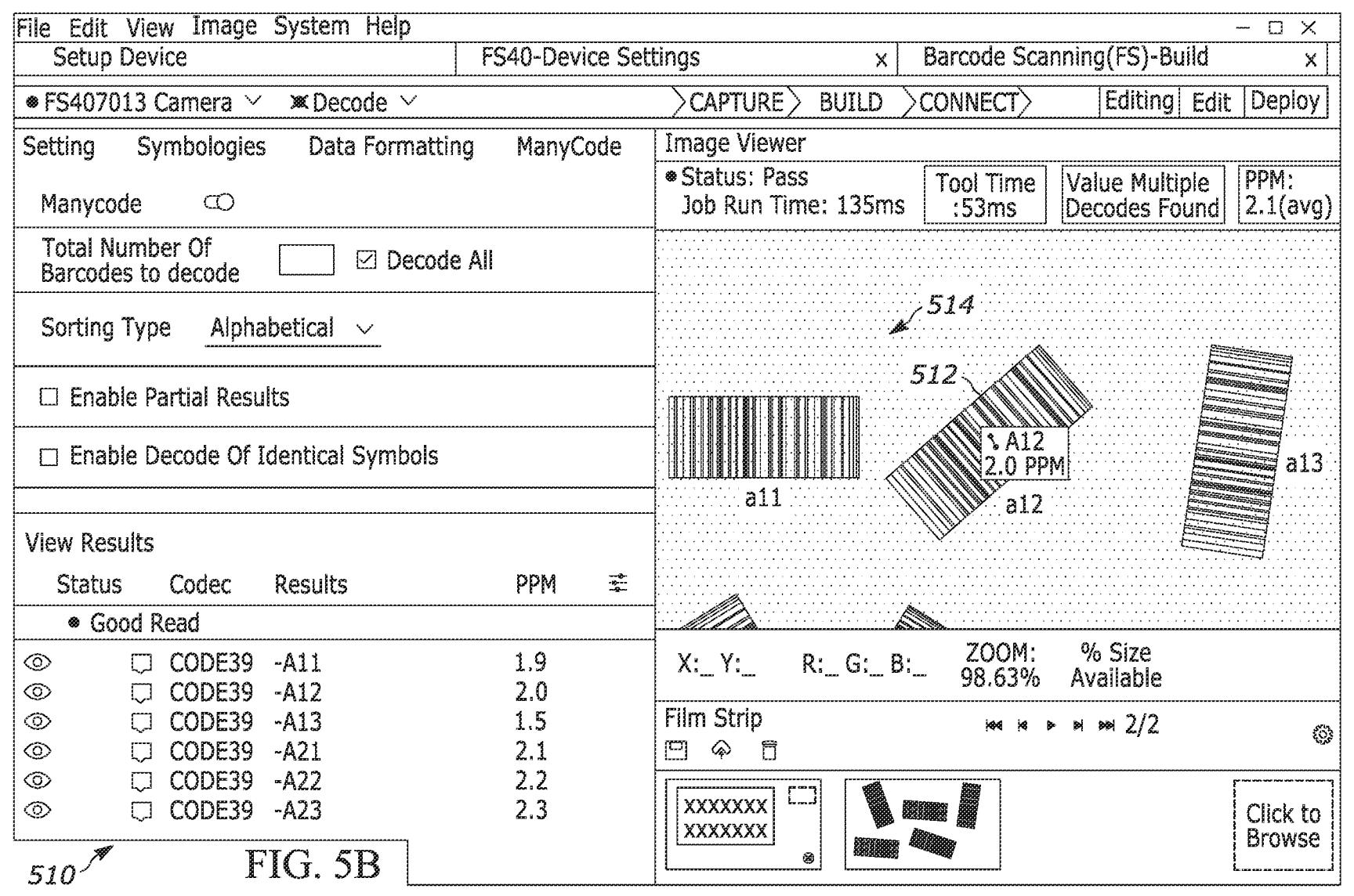
Figure 5C:
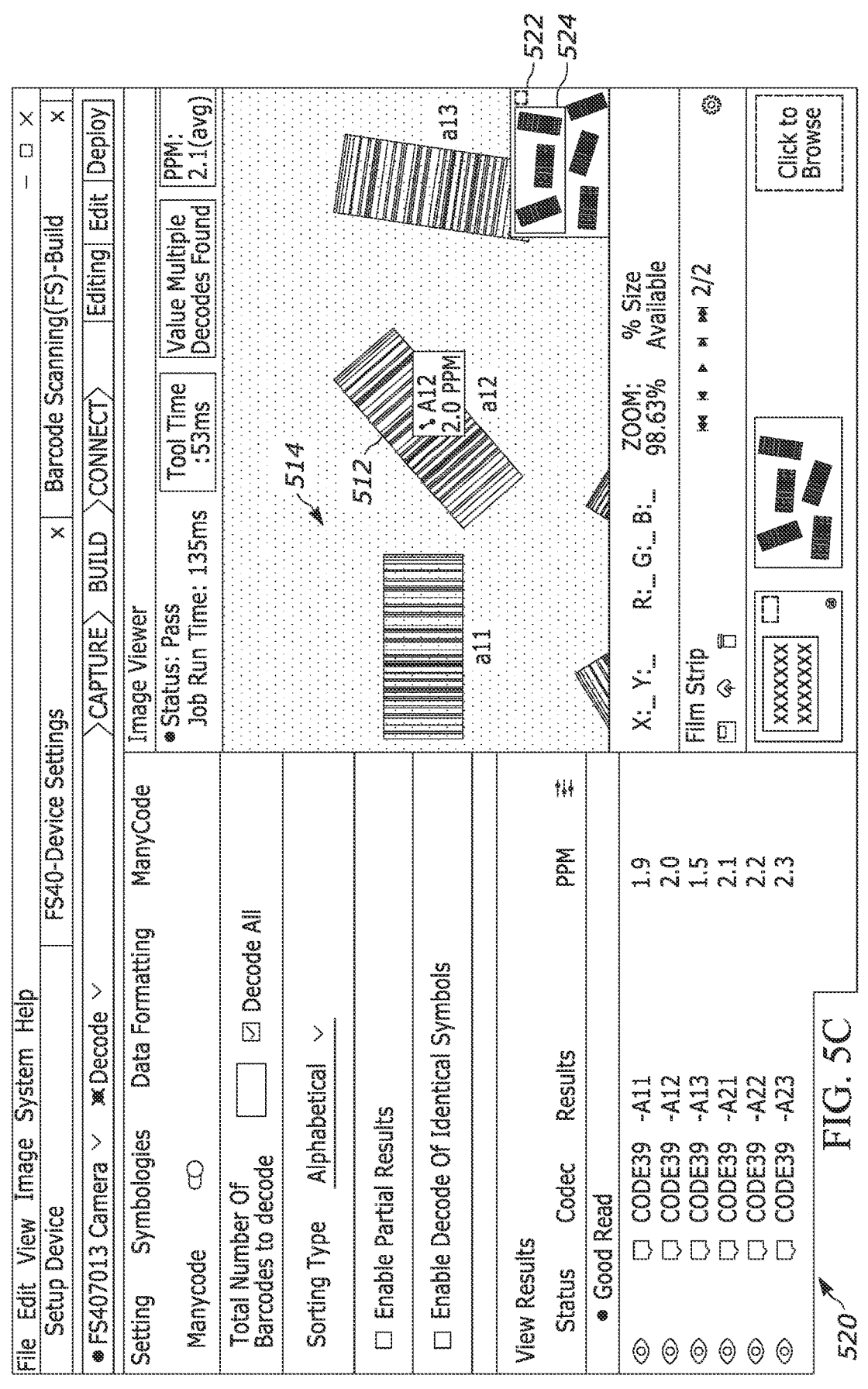

In some instances, as for example in FIGS. 5B and 5C, before/after scaling, the region outside of the selected indicia may be masked to highlight the selected indicia. This mask may be applied outside of the secondary box or outside the bounding box of the selected indicia. The mask may be transparent, opaque, color-changing, sharpness decreasing, or any other in nature which would call the indicia of interest to the forefront of the user's attention.

For example, as illustrated in FIG. 5B, the image enhancement application may display an example application interface 510 that features a selected indicia 512 and a masked background portion 514. The user may configure the image enhancement application to automatically mask the masked background portion 514 upon completion of the image scaling, and/or at any other point after the user selects the selected indicia 512. Additionally, or alternatively, the image enhancement application may provide a variety of graphical indications to allow a user to understand what indicia is currently displayed, and where the indicia is located within the displayed image.

As an example, FIG. 5C depicts an example application interface 520 depicting the selected indicia 512, the masked background portion 514, and a miniature image 522 that includes a scaled image indicator 524. The miniature image 522 may generally represent the original image from which the displayed image was generated (e.g., via repositioning, scaling, masking), and the scaled image indicator 524 may provide a graphical indication of the displayed image as part of the original image for a user's reference. The image enhancement application may automatically, upon selection of the indicia, scale the image to generate the displayed image and display the miniature image 522 and scaled image indicator 524 so that the user does not lose track of where the displayed image and selected indicia 512 are relative to the original image. Further, in certain aspects, the image enhancement application may render an animation, upon the user selection of the selected indicia 512, within the display region that minimizes the original image into the miniature image 522 and thereafter generate the scaled image indicator 524 as an overlay over the miniature image 522.

Figure 6:
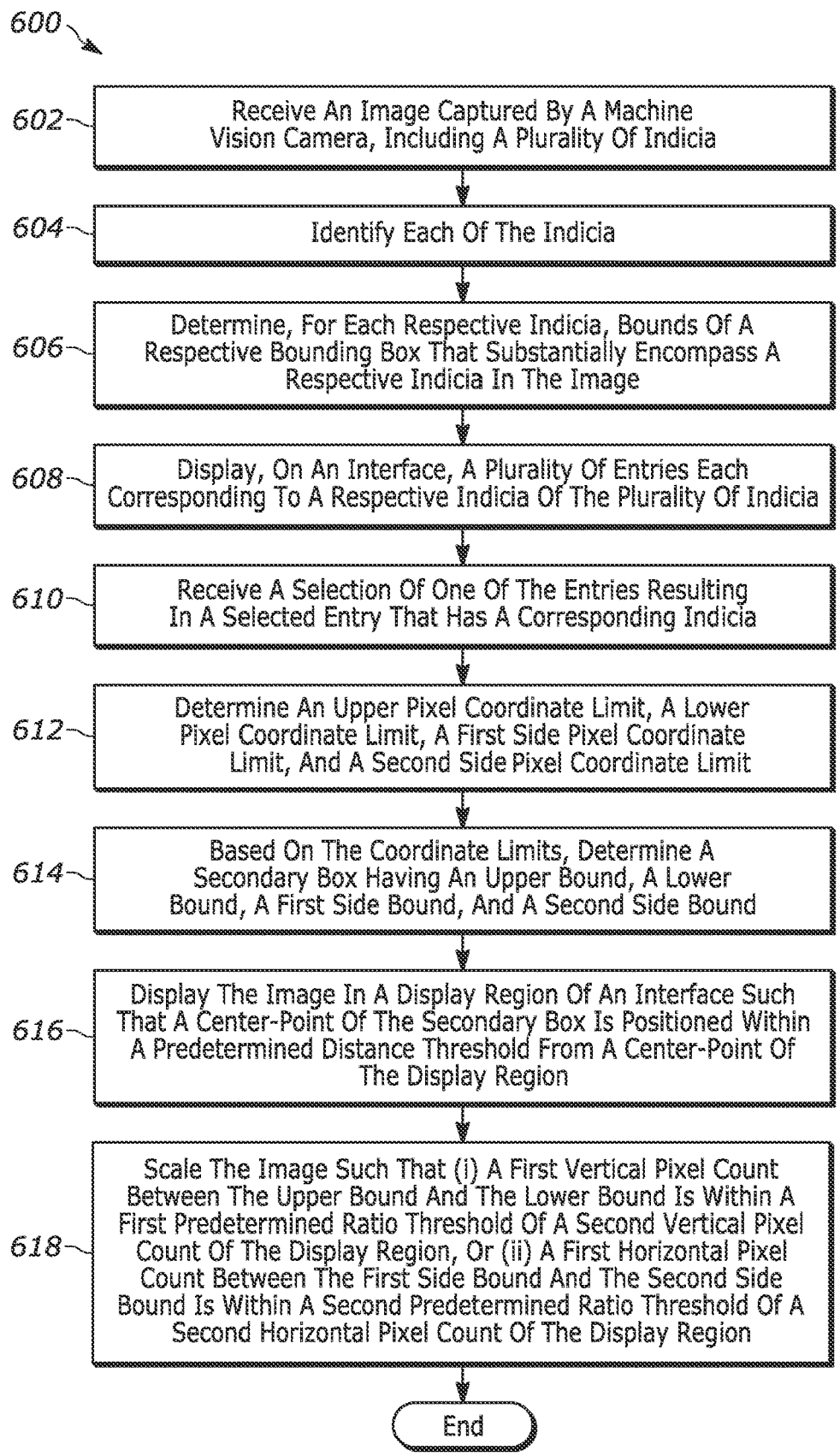
FIG. 6 is a flowchart representative of a method for enhancing image content captured by a machine vision camera, in accordance with embodiments described herein.

FIG. 6 is a flowchart representative of a method 600 for enhancing image content captured by a machine vision camera, in accordance with embodiments described herein. The method 600 includes receiving an image captured by the machine vision camera (block 602). The image may be received at an application executing on a user computing device communicatively coupled to a machine vision camera, and the image may include a plurality of indicia (e.g., barcodes, QR codes, etc.). Moreover, each of the plurality of indicia may encode a payload.

The method 600 may also include identifying, in the received image, each of the indicia (block 604). Accordingly, for each respective indicia in the image, the method 600 may include determining bounds of a respective bounding box that substantially encompass each respective indicia in the image (block 606). For example, the image enhancement application may determine the bounds of a respective bounding box corresponding to a single indicia by identifying the extreme coordinates of the indicia that define the outermost boundary of the indicia within the image. Thus, in certain aspects, the bounding box may be any suitable shape in order to substantially encompass the indicia.

The method 600 may also include displaying a plurality of entries, wherein each of the plurality of entries corresponds to a respective indicia of the plurality of indicia (block 608). In certain aspects, each of the plurality of entries includes a payload of the corresponding indicia. A user may interact with the interface in order to indicate a selection of one or more of the displayed entries and/or indicia. As such, the method 600 may include receiving, at the interface, a selection of one of the entries resulting in a selected entry that has a corresponding indicia (block 610).

In certain aspects, the application (e.g., image enhancement application) may mask a region of the display region upon selection of an entry/indicia by a user. Thus, the method 600 may include masking a masked region in the display region responsive to receiving the selection. In these aspects, the masked region may be a region outside of at least one of (i) the secondary box or (ii) the respective bounding box of the corresponding indicia.

The method 600 may also include determining an upper pixel coordinate limit, a lower pixel coordinate limit, a first side pixel coordinate limit, and a second side coordinate limit (block 612). The image enhancement application may determine these coordinate limits based on the respective bounding box of the corresponding indicia. Based on these coordinate limits, the image enhancement application may determine a secondary box having an upper bound, a lower bound, a first side bound, and a second side bound (block 614).

The method 600 may also include displaying the image in a display region of the interface such that a center-point of the secondary box is positioned within a predetermined distance threshold from a center-point of the display region (block 616). In certain aspects, for each respective indicia in the image, the image enhancement application may display the respective bounding box on an interface of the application. In some aspects, the image enhancement application may display the respective bounding box corresponding to each of the plurality of indicia appearing within a visible portion of the image displayed in the display region.

The method 600 may also include scaling the image such that at least one of (i) a first vertical pixel count between the upper bound and the lower bound is within a first predetermined ratio threshold of a second vertical pixel count of the display region, or (ii) a first horizontal pixel count between the first side bound and the second side bound is within a second predetermined ratio threshold of a second horizontal pixel count of the display region (block 618). In certain aspects, at least one of the first predetermined ratio threshold or the second predetermined ratio threshold is inclusively between 1:2 and 2:3. In some aspects, the image enhancement application may scale the image such that (i) the first vertical pixel count does not exceed the first predetermined ratio threshold of the second vertical pixel count, and (ii) the first horizontal pixel count does not exceed the second predetermined ratio threshold of the second horizontal pixel count.

Moreover, in certain aspects, at least one of the first predetermined ratio threshold and the second predetermined ratio threshold is user-definable such that a portion of the corresponding indicia is excluded from the scaled image. Additionally, or alternatively, the image enhancement application may display a miniature version of the image in the display region as an overlay covering a portion of the scaled image. In these aspects, the miniature version of the image includes an indicated portion representing the scaled image.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or to perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC (s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for enhancing image content captured by a machine vision camera, the method comprising:
  receiving, at an application executing on a user computing device communicatively coupled to a machine vision camera, an image captured by the machine vision camera, the image including a plurality of visual features;
  identifying, in the image, each of the visual features;
  for each respective visual feature in the image, determining bounds that substantially encompass each respective visual feature in the image;
  displaying, on an interface of the application, a plurality of entries, each of the plurality of entries corresponding to one of the respective visual features;
  receiving, at the interface, a selection of one of the entries resulting in a selected entry that has a corresponding visual feature;
  determining, from the respective bounds of the corresponding visual feature, an upper pixel coordinate limit, a lower pixel coordinate limit, a first side pixel coordinate limit, and a second side coordinate limit;
  based on the upper pixel coordinate limit, the lower pixel coordinate limit, the first side pixel coordinate limit, and the second side coordinate limit, determining a secondary upper bound, a secondary lower bound, a secondary first-side bound, and a secondary second-side bound;

displaying the image in a display region of the interface such that a center-point of the bounds is positioned within a predetermined distance threshold from a center-point of the display region; and scaling the image such that at least one of (i) a first vertical pixel count between the secondary upper bound and the secondary lower bound is within a first predetermined ratio threshold of a second vertical pixel count of the display region, or (ii) a first horizontal pixel count between the secondary first side bound and the secondary second side bound is within a second predetermined ratio threshold of a second horizontal pixel count of the display region.

2. The method of claim 1, further comprising:
for each respective visual feature in the image, displaying a respective bounding box that substantially encompass each respective visual feature on an interface of the application.

3. The method of claim 1, wherein at least one of the first predetermined ratio threshold or the second predetermined ratio threshold is inclusively between 1:2 and 2:3.

4. The method of claim 1, wherein scaling the image includes scaling the image such that (i) the first vertical pixel count does not exceed the first predetermined ratio threshold of the second vertical pixel count, and (ii) the first horizontal pixel count does not exceed the second predetermined ratio threshold of the second horizontal pixel count.

5. The method of claim 1, wherein each of the visual features is an indicia having a payload, and wherein each of the plurality of entries includes a payload of the corresponding visual feature.

6. The method of claim 1, further comprising:
displaying a respective bounding box corresponding to each of the plurality of visual features appearing within a visible portion of the image displayed in the display region.

7. The method of claim 1, further comprising: masking a masked region in the display region responsive to receiving the selection, wherein the masked region is a region outside of at least one of (i) a secondary region based on the secondary upper bound, the secondary lower bound, the secondary first-side bound, and the secondary second-side bound or (ii) the respective bounds of the corresponding visual feature.

8. The method of claim 1, wherein at least one of the first predetermined ratio threshold and the second predetermined ratio threshold is user-definable such that a portion of the corresponding visual feature is excluded from the scaled image.

9. The method of claim 1, further comprising:
displaying a miniature version of the image in the display region as an overlay covering a portion of the scaled image, wherein the miniature version of the image includes an indicated portion representing the scaled image.

10. A method for enhancing image content captured by a machine vision camera, the method comprising:
receiving, at an application executing on a user computing device communicatively coupled to a machine vision camera, an image captured by the machine vision camera, the image including a plurality of visual features;
identifying, in the image, each of the visual features;
for each of the visual features in the image:
determining bounds of a respective bounding region that substantially encompass the respective visual feature,
determining, from the respective bounding region, an upper pixel coordinate limit, a lower pixel coordinate limit, a first side pixel coordinate limit, and a second side coordinate limit for the respective visual feature, and
based on the upper pixel coordinate limit, the lower pixel coordinate limit, the first side pixel coordinate limit, and the second side coordinate limit of the respective bounding region, determining a respective secondary region having an upper bound, a lower bound, a first side bound, and a second side bound for the respective visual feature;
displaying, on an interface of the application, a plurality of entries, each of the plurality of entries corresponding to a respective visual feature of the plurality of visual features;
receiving, at the interface, a selection of one of the entries resulting in a selected entry that has a corresponding visual feature;
displaying the image in a display region of the interface such that a center-point of the respective secondary region of the corresponding visual feature is positioned within a predetermined distance threshold from a center-point of the display region; and
scaling the image such that at least one of (i) a first vertical pixel count between the upper bound of the respective secondary region of the corresponding visual feature and the lower bound of the respective secondary region of the corresponding visual feature is within a first predetermined ratio threshold of a second vertical pixel count of the display region, or (2) a first horizontal pixel count between the first side bound of the respective secondary region of the corresponding visual feature and the second side bound of the respective secondary region of the corresponding visual feature is within a second predetermined ratio threshold of a second horizontal pixel count of the display region.

11. The method of claim 10, further comprising:
for each of the visual feature in the image, displaying the respective bounding region on an interface of the application.

12. The method of claim 10, wherein at least one of the first predetermined ratio threshold or the second predetermined ratio threshold is inclusively between 1:2 and 2:3.

13. The method of claim 10, wherein scaling the image further includes scaling the image such that (i) the first vertical pixel count does not exceed the first predetermined ratio threshold of the second vertical pixel count, and (2) the first horizontal pixel count does not exceed the second predetermined ratio threshold of the second horizontal pixel count.

14. The method of claim 10, wherein each of the visual features is an indicia having a payload, and wherein each of the plurality of entries includes a payload of the corresponding visual feature.

15. The method of claim 10, further comprising:
displaying the respective bounding region corresponding to each of the plurality of visual features appearing within a visible portion of the image displayed in the display region.

16. The method of claim 10, further comprising:
masking a masked region in the display region responsive to receiving the selection, wherein the masked region is a region outside of one of (i) the respective secondary region of the corresponding visual feature or (ii) the respective bounding region of the corresponding visual feature.

17. A machine vision system for enhancing image content captured by a machine vision camera, the system comprising:
- a machine vision camera configured to capture an image including a plurality of visual features; and
- a user computing device executing an application, wherein the user computing device is communicatively coupled to the machine vision camera and is configured to:
  - receive the image captured by the machine vision camera,
  - identify, in the image, each of the visual features,
  - for each respective visual feature in the image, determine bounds of a respective bounding region that substantially encompass each respective visual feature in the image,
  - display, on an interface of the application, a plurality of entries, each of the plurality of entries corresponding to a respective visual feature,
  - receive, at the interface, a selection of one of the entries resulting in a selected entry that has a corresponding visual feature,
  - determine, from the respective bounding region of the corresponding visual feature, an upper pixel coordinate limit, a lower pixel coordinate limit, a first side pixel coordinate limit, and a second side coordinate limit,
  - based on the upper pixel coordinate limit, the lower pixel coordinate limit, the first side pixel coordinate limit, and the second side coordinate limit, determine a secondary region having an upper bound, a lower bound, a first side bound, and a second side bound,
  - display the image in a display region of the interface such that a center-point of the secondary region is positioned within a predetermined distance threshold from a center-point of the display region, and
  - scale the image such that at least one of (i) a first vertical pixel count between the upper bound and the lower bound is within a first predetermined ratio threshold of a second vertical pixel count of the display region, or (ii) a first horizontal pixel count between the first side bound and the second side bound is within a second predetermined ratio threshold of a second horizontal pixel count of the display region.

18. The system of claim 17, wherein the user computing device is further configured to:
- for each of the visual features in the image, display the respective bounding region on an interface of the application.

19. The system of claim 17, wherein at least one of the first predetermined ratio threshold or the second predetermined ratio threshold is inclusively between 1:2 and 2:3.

20. The system of claim 17, wherein the user computing device is further configured to scale the image such that (i) the first vertical pixel count does not exceed the first predetermined ratio threshold of the second vertical pixel count, and (2) the first horizontal pixel count does not exceed the second predetermined ratio threshold of the second horizontal pixel count.

* * * * *